United States Patent
Nakano et al.

(10) Patent No.: US 12,527,132 B2
(45) Date of Patent: Jan. 13, 2026

(54) LIGHT EMITTING DEVICE

(71) Applicant: NICHIA CORPORATION, Anan (JP)

(72) Inventors: Makoto Nakano, Anan (JP); Atsushi Bando, Anan (JP)

(73) Assignee: NICHIA CORPORATION, Anan (JP)

( * ) Notice: Subject to any disclaimer, the term of this patent is extended or adjusted under 35 U.S.C. 154(b) by 395 days.

(21) Appl. No.: 18/245,334

(22) PCT Filed: Aug. 20, 2021

(86) PCT No.: PCT/JP2021/030507
§ 371 (c)(1),
(2) Date: Mar. 14, 2023

(87) PCT Pub. No.: WO2022/059422
PCT Pub. Date: Mar. 24, 2022

(65) Prior Publication Data
US 2023/0369547 A1 Nov. 16, 2023

(30) Foreign Application Priority Data
Sep. 15, 2020 (JP) .................................. 2020-154909

(51) Int. Cl.
*H10H 20/851* (2025.01)
*C09K 11/08* (2006.01)
*C09K 11/64* (2006.01)

(52) U.S. Cl.
CPC ..... *H10H 20/8513* (2025.01); *C09K 11/0855* (2013.01); *C09K 11/643* (2013.01); *C09K 11/646* (2013.01)

(58) Field of Classification Search
CPC .......... H10H 20/8513; H10H 20/8512; C09K 11/0855; C09K 11/643; C09K 11/646;
(Continued)

(56) References Cited

U.S. PATENT DOCUMENTS 8,581,488 B2   11/2013   Sakuta et al.
8,829,778 B2    9/2014   Sakuta et al.
(Continued)

FOREIGN PATENT DOCUMENTS

JP   2012056970 A   3/2012
JP   2016111190 A   6/2016
(Continued)

*Primary Examiner* — Bitew A Dinke
(74) *Attorney, Agent, or Firm* — Hunton Andrews Kurth LLP

(57) ABSTRACT

To provide a light emitting device having a good color rendering property and a specific melanopic ratio.

A light emitting device includes a light emitting element, and a fluorescent member including a phosphor. The light emitting device satisfies any of Condition (A): a correlated color temperature of light emission of the light emitting device is within a range of 4500 K or more and 7500 K or less, a content of a first phosphor is within a range of 29 mass % or more and 90 mass % or less, and a melanopic ratio is within a range of 1.0 or more and 1.4 or less; Condition (B): a correlated color temperature of light emission of the light emitting device is within a range of 2500 K or more and less than 4500 K, a content of a first phosphor is within a range of 25 mass % or more and 90 mass % or less, and a melanopic ratio is within a range of 0.7 or more and 1.1 or less; and Condition (C): a correlated color temperature of light emission of the light emitting device is within a range of 2500 K or more and 3000 K or less, a content of a first phosphor is within a range of 20 mass % or more and 90 mass % or less, and a melanopic ratio is within a range of 0.48 or more and 1.10 or less.

12 Claims, 3 Drawing Sheets

(58) Field of Classification Search
CPC ... C09K 11/77348; C09K 11/08; C09K 11/64; C09K 11/77342; Y02B 20/00
See application file for complete search history.

(56) References Cited

U.S. PATENT DOCUMENTS

| | | | |
|---|---|---|---|
| 10,434,280 | B2 | 10/2019 | Peeters et al. |
| 10,505,081 | B2 * | 12/2019 | Nakano .................. C09K 11/7734 |
| 10,811,572 | B2 | 10/2020 | Kim et al. |
| 10,818,827 | B2 | 10/2020 | Fujio et al. |
| 11,127,888 | B2 * | 9/2021 | An .......................... H10H 20/00 |
| 11,292,963 | B2 | 4/2022 | Murazaki |
| 11,329,197 | B2 * | 5/2022 | Asai .................... C09K 11/7734 |
| 11,545,599 | B2 | 1/2023 | Kim et al. |
| 11,677,050 | B2 * | 6/2023 | Iwasa .................. H10H 20/8512 |
| | | | 252/301.4 R |
| 11,698,182 | B2 * | 7/2023 | Zhou .......................... F21K 9/64 |
| | | | 362/231 |
| 11,990,571 | B2 * | 5/2024 | Iwasa ...................... A61L 2/084 |
| 12,287,089 | B2 * | 4/2025 | Niki ...................... H05B 45/20 |
| 2012/0112626 | A1 | 5/2012 | Sakuta et al. |
| 2014/0042896 | A1 * | 2/2014 | Sakuta ................. H10H 20/813 |
| | | | 313/501 |
| 2017/0309795 | A1 | 10/2017 | Kim et al. |
| 2017/0345976 | A1 * | 11/2017 | Asai .................... C09K 11/7721 |
| 2018/0056027 | A1 * | 3/2018 | Peeters ................. A61M 21/02 |
| 2019/0013448 | A1 * | 1/2019 | Nakano .............. C09K 11/7734 |
| 2019/0097093 | A1 * | 3/2019 | Seki ................... H10H 20/8514 |
| 2019/0097098 | A1 * | 3/2019 | Fujio ................. C09K 11/77348 |
| 2019/0177607 | A1 * | 6/2019 | Murazaki ........... C09K 11/7734 |
| 2020/0045788 | A1 * | 2/2020 | Petluri .................. H05B 45/10 |
| 2020/0105981 | A1 * | 4/2020 | Fujio .................. C09K 11/7707 |
| 2020/0313045 | A1 * | 10/2020 | Asai .................... H01L 25/0753 |
| 2020/0329539 | A1 * | 10/2020 | Haraguchi ............. H05B 47/16 |
| 2020/0367341 | A1 | 11/2020 | Van Der Poel |
| 2020/0405997 | A1 * | 12/2020 | Shan .................. H10H 20/8513 |
| 2021/0013383 | A1 * | 1/2021 | Fujio .................. H10H 20/8515 |
| 2021/0028334 | A1 | 1/2021 | Kim et al. |
| 2021/0376201 | A1 * | 12/2021 | Iwasa ................. H10H 20/8513 |
| 2021/0404632 | A1 * | 12/2021 | Niki ........................... F21V 9/45 |
| 2022/0090761 | A1 * | 3/2022 | Zhou ......................... F21V 9/32 |
| 2023/0056190 | A1 | 2/2023 | Kim et al. |
| 2023/0156883 | A1 * | 5/2023 | Peeters .................. H05B 45/20 |
| | | | 315/185 R |
| 2023/0207747 | A1 * | 6/2023 | Matsumoto ........ C09K 11/7734 |
| | | | 257/98 |
| 2023/0369547 | A1 * | 11/2023 | Nakano ............. C09K 11/77342 |

FOREIGN PATENT DOCUMENTS

| | | |
|---|---|---|
| JP | 2017168795 A | 9/2017 |
| JP | 2017531324 A | 10/2017 |
| JP | 2017216438 A | 12/2017 |
| JP | 2018511386 A | 4/2018 |
| JP | 2018129492 A | 8/2018 |
| JP | 2018182028 A | 11/2018 |
| JP | 2019062063 A | 4/2019 |
| JP | 2019067808 A | 4/2019 |
| JP | 2019099780 A | 6/2019 |
| JP | 2019212905 A | 12/2019 |
| JP | 2020057777 A | 4/2020 |
| JP | 2020098855 A | 6/2020 |
| JP | 2020136619 A | 8/2020 |
| JP | 2020167399 A | 10/2020 |
| WO | 2016146688 A1 | 9/2016 |
| WO | 2019105885 A1 | 6/2019 |
| WO | WO-2021199752 A1 * | 10/2021 ......... H10H 20/8513 |

* cited by examiner

LIGHT EMITTING DEVICE

CROSS-REFERENCE TO RELATED APPLICATION

This application is a national stage entry of International Application No. PCT/JP2021/030507 filed on Aug. 20, 2021, which claims priority to Japanese Patent Application No. 2020-154909, filed on Sep. 15, 2020, the disclosures of which are hereby incorporated by reference in their entireties.

TECHNICAL FIELD

The present invention relates to a light emitting device.

BACKGROUND ART

As a light emitting device using a light emitting element such as a light emitting diode (LED), a light emitting device is known that emits mixed color light by using a light emitting element that emits blue light and a phosphor that emits light when excited by the light from the light emitting element. Such a light emitting device is used in a wide range of fields such as in, for example, general lighting, on-board lighting, displays, and liquid crystal backlights.

Light emitted from a light emitting device affects visibility of an irradiated object. As a light emitting device or a lighting device, a lighting device is demanded that emits light having a color temperature or a correlated color temperature different around a blackbody locus in accordance with a usage environment. The blackbody locus is a curved line on a chromaticity diagram followed by chromaticity coordinates of blackbody radiation when a temperature of a blackbody changes (JIS Z 8725). The chromaticity diagram refers to a CIE 1931 chromaticity diagram defined by Commission Internationale de l'Eclairage (CIE). Light becomes white light tinged with yellow when a color temperature is low, and light becomes white light tinged with blue when the color temperature is high. Chromaticity coordinates (x, y) of the CIE 1931 chromaticity diagram may be referred to as chromaticity.

For example, Patent Literature 1 proposes a light emitting device and a lighting device that combine white light having the chromaticity located on a blackbody locus and blue monochromatic light emitted from a light emitting element.

CITATION LIST

Patent Literature

Patent Literature 1: JP 2018-129492 A

SUMMARY OF INVENTION

Technical Problem

Light affects not only visibility of an object but also a circadian rhythm of humans. "circadian" is a coined word that combines "circa" representing "about" with "dies" representing "one day" in Latin. On a retina of mammals, there is a photoreceptor called an intrinsically photosensitive retinal ganglion cell (ipRGC) in addition to a rod and a cone. The ipRGC contains a visual pigment called melanopsin, gives a light stimulus to a suprachiasmatic nucleus that manages a circadian rhythm of mammals, and performs a nerve response. When light that appropriately stimulates the nerve response affecting the circadian rhythm is applied according to the circadian rhythm of humans, humans can feel comfort. Examples of an indicator that evaluates magnitude of an influence of the applied light on the circadian rhythm include a melanopic ratio. Details of the melanopic ratio will be described below. Furthermore, it is preferable for humans that visibility of an object irradiated with light is more similar to that irradiated with natural light.

An aspect of the present invention has an object to provide a light emitting device having a good color rendering property and a specific melanopic ratio.

Solution to Problem

An aspect of the present invention is a light emitting device including a light emitting element, and a fluorescent member including a phosphor. The light emitting element, the fluorescent material, a melanopic ratio derived based on Formula (1) described below in an emission spectrum of the light emitting device, and a content percentage of a first phosphor described below with respect to a total amount of the phosphor included in the fluorescent member satisfy any of Condition (A), Condition (B), or Condition (C) described below.

$$\text{Melanopic ratio} = \frac{\int_{380}^{730} \text{Lamp} \times \text{Circadian}}{\int_{380}^{730} \text{Lamp} \times \text{Visual}} \times 1.218 \quad (1)$$

(In Formula (1) described above, "Lamp" is a spectral distribution of the light emitting device, "Circadian" is a sensitivity curve of an intrinsically photosensitive retinal ganglion cell (ipRGC) being a photoreceptor located in a retina of mammals, "Visual" is a visibility curve in photopic vision of humans, "1.218" is a constant (lux factor), and in a range of a wavelength in a range of 380 nm or more and 730 nm or less, a product of "Lamp" and "Circadian" is a circadian response included in the spectral distribution of the light emitting device and a product of "Lamp" and "Visual" is a visibility response included in the spectral distribution of the light emitting device.)

Condition (A): A correlated color temperature of light emitted by the light emitting device is within a range of 4500 K or more and 7500 K or less. A light emission peak wavelength of the light emitting element is within a range of 410 nm or more and 440 nm or less. The fluorescent member includes a first phosphor comprising at least one type selected from the group consisting of a phosphor having a composition represented by Formula (i) described below and a phosphor having a composition represented by Formula (ii) described below, a second phosphor comprising at least one type selected from the group consisting of a phosphor having a composition represented by Formula (iii) described below, a phosphor having a composition represented by Formula (iv) described below, a phosphor having a composition represented by Formula (v) described below, a phosphor having a composition represented by Formula (vi) described below, and a phosphor having a composition represented by Formula (vii) described below, and a third phosphor having a composition represented by Formula (viii) described below. A content percentage of the first phosphor is within a range of 29 mass % or more and 90 mass % or less. The melanopic ratio is within a range of 1.0 or more and 1.4 or less.

Condition (B): A correlated color temperature of light emission of the light emitting device is within a range of 2500 K or more and less than 4500 K. A light emission peak wavelength of the light emitting element is within a range of 410 nm or more and 440 nm or less. The fluorescent member includes a first phosphor comprising at least one type selected from the group consisting of a phosphor having a composition represented by Formula (i) described below and a phosphor having a composition represented by Formula (ii) described below, a second phosphor comprising at least one type selected from the group consisting of a phosphor having a composition represented by Formula (iii) described below and a phosphor having a composition represented by Formula (iv) described below, a third phosphor comprising at least one type selected from the group consisting of a phosphor having a composition represented by Formula (v) described below, a phosphor having a composition represented by Formula (vi) described below, and a phosphor having a composition represented by Formula (vii) described below, and a fourth phosphor having a composition represented by Formula (viii) described below. A content percentage of the first phosphor is within a range of 25 mass % or more and 90 mass % or less. The melanopic ratio is within a range of 0.7 or more and 1.1 or less.

Condition (C): A correlated color temperature of light emission of the light emitting device is within a range of 2500 K or more and 3000 K or less. A light emission peak wavelength of the light emitting element is within a range of 440 nm or more and 470 nm or less. The fluorescent member includes a first phosphor comprising at least one type selected from the group consisting of a phosphor having a composition represented by Formula (iii) described below and a phosphor having a composition represented by Formula (iv) described below, a second phosphor comprising at least one type selected from the group consisting of a phosphor having a composition represented by Formula (v) described below, a phosphor having a composition represented by Formula (vi) described below, and a phosphor having a composition represented by Formula (vii) described below, and a third phosphor having a composition represented by Formula (viii) described below. A content percentage of the first phosphor is within a range of 20 mass % or more and 90 mass % or less. The melanopic ratio is within a range of 0.48 or more and 1.10 or less.

$$M^1_{10}(PO_4)_6Cl_2:Eu \quad (i)$$

(In Formula (i), $M^1$ is at least one element selected from the group consisting of Ca, Sr, and Ba.)

$$M^2MgAl_{10}O_{17}:Mn,Eu \quad (ii)$$

(In Formula (ii), $M^2$ is at least one element selected from the group consisting of Ba and Sr.)

$$M^3_8MgSi_4O_{16}Cl_2:Eu \quad (iii)$$

(In Formula (iii), $M^3$ is at least one element selected from the group consisting of Ca, Sr, and Ba.)

$$Sr_4Al_{14}O_{25}:Eu \quad (iv)$$

$$M^4_3M^5_5O_{12}:Ce \quad (v)$$

(In Formula (v), $M^4$ is at least one element selected from the group consisting of Y and Gd, and $M^5$ is at least one element selected from the group consisting of Al and Ga.)

$$Lu_3M^6_5O_{12}:Ce \quad (vi)$$

(In Formula (vi), $M^6$ is at least one element selected from the group consisting of Al and Ga.)

$$Si_{6-z}Al_zO_zN_{8-z}:Eu \quad (vii)$$

(In Formula (vii), z satisfies $0 < z \leq 4.2$.)

$$M^7AlSiN_3:Eu \quad (viii)$$

(In Formula (viii), $M^7$ is at least one element selected from the group consisting of Sr and Ca.)

Advantageous Effects of Invention

An aspect of the present invention can provide a light emitting device having a good color rendering property and a specific melanopic ratio.

DESCRIPTION OF EMBODIMENTS

A light emitting device according to the present invention will be described below based on embodiments. However, the embodiments to be illustrated below are examples for embodying a technical concept of the present invention, and the present invention is not limited to the following light emitting device. Note that the relationship between the color name and the chromaticity coordinates, and the relationship between the wavelength range of light and the color name of monochromatic light conform to HS Z 8110. When a plurality of substances applicable to each component in a composition are present, the content of each component in the composition means the total amount of the plurality of substances present in the composition, unless otherwise specified.

Light Emitting Device

Figure 1:
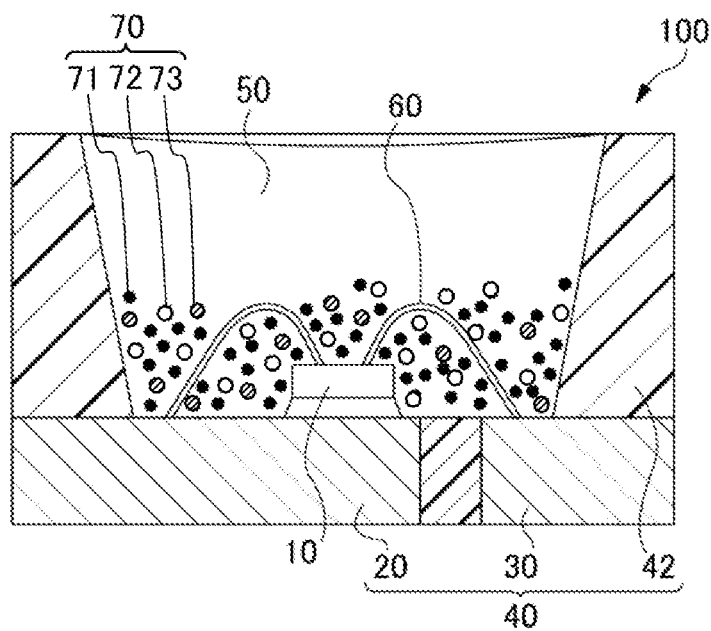
FIG. 1 is a schematic cross-sectional view illustrating a first example of a light emitting device.
Figure 2:
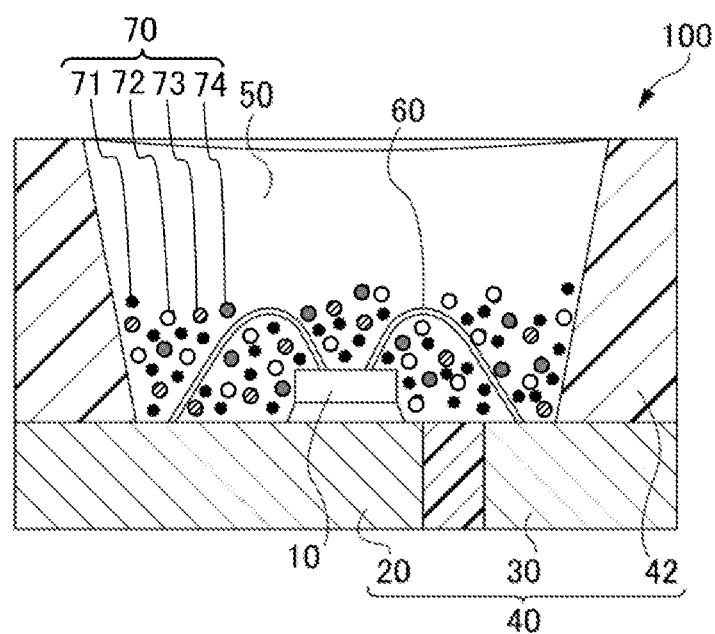
FIG. 2 is a schematic cross-sectional view illustrating a second example of the light emitting device.

The light emitting device includes a light emitting element, and a fluorescent member including a phosphor. An example of the light emitting device will be described based on the drawings. FIG. 1 illustrates a first example of the light emitting device and is a schematic cross-sectional view illustrating a light emitting device 100. FIG. 2 illustrates a second example of the light emitting device and is different from the first example in a type of a phosphor included in the light emitting device 100.

The light emitting device 100 includes a light emitting element 10, and a fluorescent member 50 including at least one type of a phosphor 70 that emits light when excited by light from the light emitting element 10. The light emitting device 100 includes a molded body 40, and the molded body 40 is formed by integrally molding a first lead 20, a second lead 30, and a resin portion 42 including a thermoplastic resin or a thermosetting resin. The molded body 40 forms a recessed portion including a bottom surface and a lateral surface, and the light emitting element 10 is mounted on an upward surface that defines the recessed portion. The light emitting element 10 includes a pair of positive and negative electrodes, and the pair of the positive and negative electrodes are electrically connected to the first lead 20 and the second lead 30 via wires 60, respectively. The light emitting element 10 receives a power supply from the outside via the first lead 20 and the second lead 30, and thus the light emitting device 100 can emit light.

The light emitting element 10 is used as an excitation light source. The light emitting element 10 has a light emission peak wavelength within a range of 380 nm or more and 500 nm or less. The light emitting element 10 may have the light emission peak wavelength within a range of 410 nm or more and 440 nm or less or may have the light emission peak wavelength within a range of 440 nm or more and 470 nm or less. A full width at half maximum of an emission spectrum of the light emitting element 10 may be, for example, equal to or less than 30 nm, equal to or less than 25 nm, or equal to or less than 20 nm. For example, the light emitting element 10 is preferably a semiconductor light emitting element that uses a nitride-based semiconductor. By using the semiconductor light emitting element as the light emitting element, a stable light emitting device that exhibits high efficiency and high linearity with respect to an input and that is strong against a mechanical impact can be obtained. In the present description, the full width at half maximum in the emission spectrum of the light emitting element and the phosphor refers to a full width at half maximum (FWHM) of an emission peak in the emission spectrum and refers to a width of a wavelength indicating light emission intensity being 50% of light emission intensity at the light emission peak wavelength in the emission spectrum.

The light emitting element 10 is covered with the fluorescent member 50. The fluorescent member 50 includes a phosphor 70 that converts a wavelength of the light from the light emitting element 10, and a sealing material. The phosphor 70 is excited by the light from the light emitting element and has at least one light emission peak wavelength in a specific wavelength range. The fluorescent member 50 may include a first phosphor 71, a second phosphor 72, and a third phosphor 73 as the phosphor 70. The fluorescent member 50 may include the first phosphor 71, the second phosphor 72, the third phosphor 73, and a fourth phosphor 74 as the phosphor 70. FIG. 1 illustrates, as the first example, the light emitting device including the first phosphor 71, the second phosphor 72, and the third phosphor 73 as the phosphor 70 in the fluorescent member 50. FIG. 2 illustrates, as the second example, the light emitting device including the first phosphor 71, the second phosphor 72, the third phosphor 73, and the fourth phosphor 74 as the phosphor 70 in the fluorescent member 50.

A resin selected from a thermoplastic resin and a thermosetting resin can be used for the sealing material included in the fluorescent member 50. Examples of the resin used as the sealing material include, for example, a silicone resin and an epoxy resin. The fluorescent member 50 may include another component such as a filler, a light stabilizer, and a coloring agent in addition to the phosphor 70 and the sealing material. Examples of the filler can include, for example, silica, barium titanate, titanium oxide, and aluminum oxide, and the like. The content of a component other than the phosphor and the sealing material in the fluorescent member can be set in a suitable range, based on a size of the intended light emitting device, a correlated color temperature, and a color tone. For example, the content of a component other than the phosphor and the sealing material in the fluorescent member can be set in a range of 0.01 parts by mass or more and 20 parts by mass or less with respect to 100 parts by mass of the sealing material.

Phosphor

The light emitting device according to an embodiment of the present invention includes at least three or more types selected from the group consisting of a phosphor having a composition represented by Formula (i) below, a phosphor having a composition represented by Formula (ii), a phosphor having a composition represented by Formula (iii), a phosphor having a composition represented by Formula (iv), a phosphor having a composition represented by Formula (v), a phosphor having a composition represented by Formula (vi), a phosphor having a composition represented by Formula (vii), and a phosphor having a composition represented by Formula (viii).

$$M^1{}_{10}(PO_4)_6Cl_2:Eu \quad \quad (i)$$

(In Formula (i), $M^1$ is at least one element selected from the group consisting of Ca, Sr, and Ba.)

The phosphor having the composition represented by Formula (i) described above has a light emission peak wavelength within a range of 430 nm or more and 500 nm or less, and a full width at half maximum in an emission spectrum of the phosphor is within a range of 30 nm or more and 80 nm or less and is preferably within a range of 40 nm or more and 60 nm or less. In this way, light emission having a high color rendering property and a specific melanopic ratio of any of conditions (A), (B), and (C) can be obtained.

$$M^2MgAl_{10}O_{17}:Mn,Eu \quad \quad (ii)$$

(In Formula (ii), $M^2$ is at least one element selected from the group consisting of Ba and Sr.) The phosphor having the composition represented by Formula (ii) described above has a light emission peak wavelength within a range of 430 nm or more and 500 nm or less, and a full width at half maximum in an emission spectrum of the phosphor is within a range of 50 nm or more and 90 nm or less and is preferably within a range of 60 nm or more and 80 nm or less. In this way, light emission having a high color rendering property and a specific melanopic ratio of any of the conditions (A), (B), and (C) can be obtained.

$$M^3{}_8MgSi_4O_{16}Cl_2:Eu \quad \quad (iii)$$

(In Formula (iii), $M^3$ is at least one element selected from the group consisting of Ca, Sr, and Ba.)

The phosphor having the composition represented by Formula (iii) described above may have a light emission peak wavelength within a range of 480 nm or more and 580 nm or less or may have a light emission peak wavelength within a range of 480 nm or more and 530 nm or less. A full width at half maximum in an emission spectrum of the phosphor having the composition represented by Formula (iii) described above is within a range of 50 nm or more and 80 nm or less, may be within a range of 50 nm or more and 70 nm or less, or may be within a range of 60 nm or more and 80 nm or less. In this way, light emission having a high color rendering property and a specific melanopic ratio of any of the conditions (A), (B), and (C) can be obtained.

$$Sr_4Al_{14}O_{25}:Eu \quad \quad (iv)$$

The phosphor having the composition represented by Formula (iv) described above may have a light emission peak wavelength within a range of 480 nm or more and 580 nm or less or may have a light emission peak wavelength within a range of 480 nm or more and 530 nm or less. A full width at half maximum in an emission spectrum of the phosphor having the composition represented by Formula (iv) described above is within a range of 60 nm or more and 100 nm or less and is preferably within a range of 70 nm or more and 90 nm or less. In this way, light emission having a high color rendering property and a specific melanopic ratio of any of the conditions (A), (B), and (C) can be obtained.

$$M^4{}_3M^5{}_5O_{12}:Ce \qquad (v)$$

(In Formula (v), $M^4$ is at least one element selected from the group consisting of Y and Gd, and $M^5$ is at least one element selected from the group consisting of Al and Ga.) The phosphor having the composition represented by Formula (v) described above may have a light emission peak wavelength within a range of 480 nm or more and 580 nm or less or may have a light emission peak wavelength within a range of 500 nm or more and 580 nm or less. A full width at half maximum in an emission spectrum of the phosphor having the composition represented by Formula (v) described above is within a range of 80 nm or more and 140 nm or less and is preferably within a range of 90 nm or more and 130 nm or less. In this way, light emission having a high color rendering property and a specific melanopic ratio of any of the conditions (A), (B), and (C) can be obtained.

$$Lu_3M^6{}_5O_{12}:Ce \qquad (vi)$$

(In Formula (vi), $M^6$ is at least one element selected from the group consisting of Al and Ga.) The phosphor having the composition represented by Formula (vi) described above may have a light emission peak wavelength within a range of 480 nm or more and 580 nm or less or may have a light emission peak wavelength within a range of 500 nm or more and 580 nm or less. A full width at half maximum in an emission spectrum of the phosphor having the composition represented by Formula (vi) described above is within a range of 80 nm or more and 140 nm or less and is preferably within a range of 90 nm or more and 130 nm or less. In this way, light emission having a high color rendering property and a specific melanopic ratio of any of the conditions (A), (B), and (C) can be obtained.

$$Si_{6-z}Al_zO_zN_{8-z}:Eu \qquad (vii)$$

(In Formula (vii), z satisfies $0<z\leq4.2$.)

The phosphor having the composition represented by Formula (vii) described above may have a light emission peak wavelength within a range of 480 nm or more and 580 nm or less or may have a light emission peak wavelength within a range of 500 nm or more and 580 nm or less. A full width at half maximum in an emission spectrum of the phosphor having the composition represented by Formula (vii) described above is within a range of 70 nm or more and 110 nm or less and is preferably within a range of 80 nm or more and 100 nm or less. In this way, light emission having a high color rendering property and a specific melanopic ratio of any of the conditions (A), (B), and (C) can be obtained.

$$M^7AlSiN_3:Eu \qquad (viii)$$

(In Formula (viii), $M^7$ is at least one element selected from the group consisting of Sr and Ca.)

The phosphor having the composition represented by Formula (viii) described above has a light emission peak wavelength within a range of 600 nm or more and 650 nm or less, and a full width at half maximum in an emission spectrum of the phosphor is within a range of 70 nm or more and 110 nm or less and is preferably within a range of 80 nm or more and 100 nm or less. In this way, light emission having a high color rendering property and a specific melanopic ratio of any of the conditions (A), (B), and (C) can be obtained.

Figure 3:
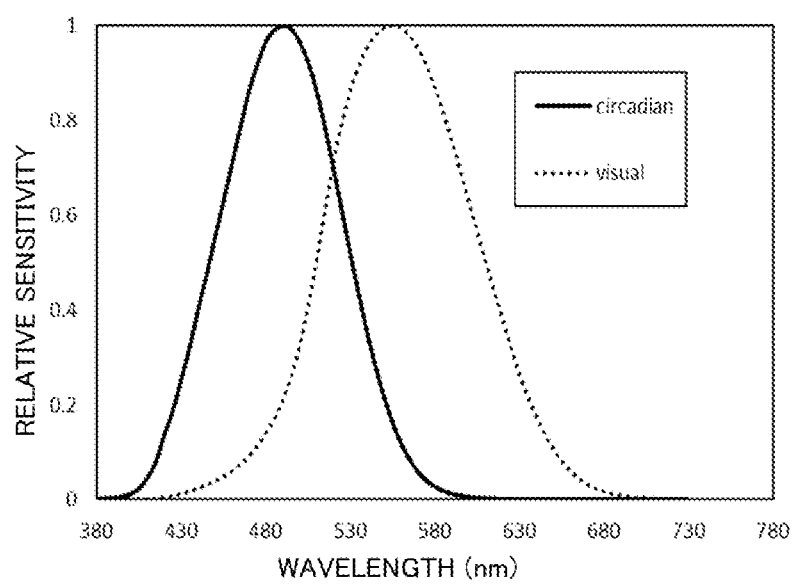
FIG. 3 is a diagram illustrating a sensitivity curve (Circadian) of an intrinsically photosensitive retinal ganglion cell, which is a photoreceptor located in a retina of mammals, and a visibility curve (Visual) in photopic vision of humans.

An intrinsically photosensitive retinal ganglion cell (ipRGC) that is a photoreceptor cell (visual cell) of a retina of humans and contains melanopsin being a visual pigment exhibits a nerve response to a light stimulus by itself, exhibits the nerve response to the light stimulus by receiving an input also from a cone and a rod, and affects a circadian rhythm of humans. The nerve response of the ipRGC is involved in secretion or suppression of melatonin being a sleep promoting hormone. When light that stimulates the nerve response affecting the circadian rhythm of humans is applied, the secretion of melatonin is suppressed to promote arousal, and on the contrary, the secretion of melatonin is promoted to induce sleep. The nerve response that affects the circadian rhythm of humans also varies depending on a color temperature of the applied light. FIG. 3 illustrates that a peak wavelength is 555 nm in a sensitivity curve (circadian action curve) of the ipRGC being a photoreceptor located in a retina of mammals defined by Commission Internationale de l'Eclairage (CIE) and a visibility curve in photopic vision of humans proposed by WELL certification (Well Building Standard) being a certification system of a building that evaluates health of humans. Melanopsin output from the ipRGC has a peak wavelength of the sensitivity around a range from 480 nm or more and 500 nm or less.

An influence of light emitted from the light emitting device on the circadian rhythm of humans can be inferred from a melanopic ratio derived from Formula (1) below.

[Math. 1]

$$\text{Melanopic ratio} = \frac{\int_{380}^{730} \text{Lamp} \times \text{Circadian}}{\int_{380}^{730} \text{Lamp} \times \text{Visual}} \times 1.218 \qquad (1)$$

In Formula (1) described above, "Lamp" is a spectral distribution of the light emitting device, "Circadian" is the sensitivity curve (circadian action curve) of the ipRGC being the photoreceptor located in the retina of mammals, "Visual" is the visibility curve in the photopic vision of humans, "1.218" is a constant (lux factor), and within a range of the wavelength in a range of 380 nm or more and 730 nm or less, a product of "Lamp" and "Circadian" is a circadian response included in the spectral distribution of the light emitting device and a product of "Lamp" and "Visual" is a visibility response included in the spectral distribution of the light emitting device. The spectral distribution (emission spectrum) of the light emitting device can be measured by using an optical measurement system that combines a spectrophotometer (for example, PMA-11 manufactured by Hamamatsu Photonics K.K.) and an integrating sphere. The visibility curve (Visual) in the photopic vision of humans is spectral luminous efficiency for the photopic vision of humans defined by CIE.

The sensitivity curve (circadian action curve) of the ipRGC and the visibility curve of humans are included in Formula (1) described above, and an influence of the spectral distribution emitted from the light emitting device on the circadian rhythm of humans can be inferred from a numerical value of the melanopic ratio. When light indicates a higher numerical value of the melanopic ratio, the circadian rhythm of humans is stimulated more strongly. In a visual environment of humans, light used in comfort is light similar to natural light. Furthermore, when a numerical value of the melanopic ratio obtained from the spectral distribution of the light emitted from the light emitting device is not too low or too high and falls within a specific range of any of the conditions (A), (B), and (C), the circadian rhythm of humans is not disturbed. When light of an appropriate melanopic ratio in accordance with a usage environment is emitted from the light emitting device, it is inferred that humans feel comfort in the visual environment.

Light emission of the light emitting device has a different correlated color temperature required in accordance with a usage situation and the like. In JIS Z 9112, for a relationship between a light source color of the light emitting device and a range of the correlated color temperature, a range of 2600 K or more and 3250 K or less is defined as an incandescent color, a range of 3250 K or more and 3800 K or less is defined as a warm white color, a range of 3800 K or more and 4500 K or less is defined as a white color, a range of 4600 K or more and 5500 K or less is defined as a neutral color, and a range of 5700 K or more and 7100 K or less is defined as a daylight color. When the correlated color temperature of the light emitting device is in a range of 2000 K or more and 7500 K or less, the light emitting device can emit light of the light source color of the incandescent color, the warm white color, the white color, the neutral color, or the daylight color defined by JIS Z 9112. For example, when the correlated color temperature of the light emission of the light emitting device is within a range of 4500 K or more and 7500 K or less, the light is similar to sunlight from the morning to around the noon. Furthermore, when the correlated color temperature of the light emission of the light emitting device is within a range of 2500 K or more and 4500 K or less, the light is similar to light from the afternoon to the sunset. Furthermore, when the correlated color temperature of the light emission of the light emitting device is within the range of 2500 K or more and 3000 K or less, the light is similar to the light from the evening to the sunset. For example, lighting in, for example, workplaces or schools requires light having a high correlated color temperature in the range of 4500 K or more and 7500 K or less. For example, lighting in houses, hotels, or restaurants requires light having a correlated color temperature in a range of 2500 K or more and less than 4500 K. Furthermore, lighting in places required of relaxation such as, for example, a living room requires light with warm tints having a correlated color temperature in a range of 2500 K or more and 3000 K or less.

A range of the melanopic ratio that affects the circadian rhythm of humans also varies depending on the correlated color temperature. For example, in a case in which the correlated color temperature of the light emission of the light emitting device is within the range of 4500 K or more and 7500 K or less and the light is similar to the sunlight from the morning to around the noon, humans are more likely to be aroused and feel comfort in schools and workplaces, if the melanopic ratio is relatively high to stimulate the ipRGC relatively strongly. Furthermore, in a case in which the correlated color temperature of the light emission of the light emitting device is within the range of 2500 K or more and less than 4500 K, the arousal of humans is not extremely promoted and humans feel comfort in houses, hotels, or restaurants by subdued lighting, if the melanopic ratio is relatively low not to stimulate the ipRGC too strongly. Furthermore, for example, in a case in which the correlated color temperature of the light emission of the light emitting device is within the range of 2500 K or more and 3000 K or less, it is thought that the ipRGC is not stimulated more than necessary, the arousal of humans is not promoted, and humans feel comfort in a living room required of a relaxed atmosphere, if the melanopic ratio is low.

The light emitting device can emit light inferred for humans to feel comfort as long as the melanopic ratio is set depending on a range of the correlated color temperature.

A light emitting device according to a first embodiment of the present invention includes a light emitting element and a fluorescent member including a phosphor and satisfies the following condition (A).

In the condition (A), a correlated color temperature of light emission of the light emitting device is within a range of 4500 K or more and 7500 K or less, a light emission peak wavelength of the light emitting element is within a range of 410 nm or more and 440 nm or less, the fluorescent member includes a first phosphor of at least one type selected from the group consisting of the phosphor having the composition represented by Formula (i) described above and the phosphor having the composition represented by Formula (ii) described above, a second phosphor of at least one type selected from the group consisting of the phosphor having the composition represented by Formula (iii) described above, the phosphor having the composition represented by Formula (iv) described above, the phosphor having the composition represented by Formula (v) described above, the phosphor having the composition represented by Formula (vi) described above, and the phosphor having the composition represented by Formula (vii) described above, and a third phosphor being the phosphor having the composition represented by Formula (viii) described above, the content of the first phosphor with respect to a total amount of the phosphor included in the fluorescent member is within a range of 29 mass % or more and 90 mass % or less, and a melanopic ratio derived based on Formula (1) described above in an emission spectrum of the light emitting device described above is within a range of 1.0 or more and 1.4 or less.

When the light emitting device satisfies the condition (A) and the correlated color temperature of the light emission of the light emitting device is within the range of 4500 K or more and 7500 K or less, the ipRGC is stimulated relatively strongly, and the arousal of humans is promoted, if the content of the first phosphor with respect to the total amount of the phosphor included in the fluorescent member is set within the range of 29 mass % or more and 90 mass % or less and the melanopic ratio derived based on Formula (1) described above in the emission spectrum of the light emitting device is within the range of 1.0 or more and 1.4 or less. Thus, in workplaces or schools, the light inferred for humans to feel comfort is emitted from the light emitting device. The total amount of the phosphor included in the fluorescent member refers to a total amount of the first phosphor, the second phosphor, and the third phosphor.

In the light emitting device that satisfies the condition (A), the melanopic ratio derived based on Formula (1) described above in the emission spectrum of the light emitting device is within the range of 1.0 or more and 1.4 or less and is preferably within a range of 1.15 or more and 1.4 or less. When the melanopic ratio derived based on Formula (1) described above in the emission spectrum of the light emitting device is within the range of 1.0 or more and 1.4 or less, the ipRGC is stimulated relatively strongly, and the arousal of humans is promoted. Thus, in workplaces or schools, the light inferred for humans to feel comfort is emitted from the light emitting device.

In the light emitting device that satisfies the condition (A), the content of the second phosphor with respect to the total amount of the phosphor included in the fluorescent member is preferably within a range of 9 mass % or more and 70 mass % or less. In the light emitting device that satisfies the condition (A), the content of the third phosphor with respect to the total amount of the phosphor included in the fluorescent member is preferably within a range of 1 mass % or more and 10 mass % or less.

In the light emitting device that satisfies the condition (A), the content of the first phosphor with respect to the total amount of the phosphor included in the fluorescent member may be within a range of 40 mass % or more and 85 mass % or less, the content of the second phosphor with respect to the total amount of the phosphor included in the fluorescent member may be within a range of 14 mass % or more and 59 mass % or less, and the content of the third phosphor with respect to the total amount of the phosphor included in the fluorescent member may be within a range of 1 mass % or more and 8 mass % or less.

In the light emitting device that satisfies the condition (A), with respect to the total amount of the phosphors included in the fluorescent member, the content of the first phosphor with respect to the total amount of the phosphor included in the fluorescent member may be within a range of 50 mass % or more and 80 mass % or less, the content of the second phosphor with respect to the total amount of the phosphor included in the fluorescent member may be within a range of 19 mass % or more and 49 mass % or less, and the content of the third phosphor with respect to the total amount of the phosphor included in the fluorescent member may be within a range of 1 mass % or more and 6 mass % or less.

In the light emitting device that satisfies the condition (A), the first phosphor may be the phosphor having the composition represented by Formula (i) described above, and the second phosphor may be the phosphor having the composition represented by Formula (v) described above.

In the light emitting device that satisfies the condition (A), the first phosphor may be the phosphor having the composition represented by Formula (i) described above, the second phosphor may be the phosphor having the composition represented by Formula (v) described above, the third phosphor may be the phosphor having the composition represented by Formula (viii) described above, the content of the first phosphor with respect to the total amount of the phosphor included in the fluorescent member may be within the range of 50 mass % or more and 80 mass % or less, the content of the second phosphor with respect to the total amount of the phosphor included in the fluorescent member may be within the range of 19 mass % or more and 49 mass % or less, and the content of the third phosphor with respect to the total amount of the phosphor included in the fluorescent member may be within the range of 1 mass % or more and 6 mass % or less.

In the light emitting device that satisfies the condition (A), the first phosphor may be the phosphor having the composition represented by Formula (i) described above, the second phosphor may be the phosphor having the composition represented by Formula (v) described above, the third phosphor may be the phosphor having the composition represented by Formula (viii) described above, the content of the first phosphor with respect to the total amount of the phosphor included in the fluorescent member may be within the range of 50 mass % or more and 80 mass % or less, the content of the second phosphor with respect to the total amount of the phosphor included in the fluorescent member may be within the range of 19 mass % or more and 49 mass % or less, the content of the third phosphor with respect to the total amount of the phosphor included in the fluorescent member may be within the range of 1 mass % or more and 6 mass % or less, and the melanopic ratio derived based on Formula (1) described above in the emission spectrum of the light emitting device may be within the range of 1.15 or more and 1.4 or less.

In the phosphor included in the light emitting device that satisfies the condition (A), it is preferable that the first phosphor has the light emission peak wavelength within a range of 430 nm or more and 500 nm or less, the second phosphor has the light emission peak wavelength within a range of 480 nm or more and 580 nm or less, and the third phosphor has the light emission peak wavelength within a range of 600 nm or more and 650 nm or less. The first phosphor, the second phosphor, and the third phosphor can absorb light from the light emitting element having the light emission peak wavelength within the range of 410 nm or more and 440 nm or less and can emit mixed color light having the correlated color temperature within the range of 4500 K or more and 7500 K or less.

A color reproduction property affects visibility of an object irradiated with light. The color reproduction property (color rendering property) of the object irradiated with light is represented by a color rendering index. When the color rendering index is a numerical value closer to 100, light has a better color rendering property similar to a reference light source that represents natural light.

According to a classification of a fluorescent lamp and an LED by light-source color and color rendering property in JIS Z 9112, the color rendering property of the LED is classified into a normal type and a high color rendering type, and a general color rendering index Ra of the high color rendering type is defined to be equal to or more than 80. According to a guideline of CIE, a preferable general color rendering index Ra depending on a place for use is set in a range of 60 or more and less than 80 in places for ordinary work, is set in a range of 80 or more and less than 90 in, for example, houses, hotels, restaurants, places for precision work, or the like, and is set to be equal to or more than 90 in galleries, museums, places for clinical inspections, or the like requiring a high color rendering property. When the general color rendering index Ra of the light emitting device is equal to or more than 80, the device can be used as lighting having a color rendering property in which humans feel comfort.

Here, for an evaluation procedure of the color rendering property of a light source, JIS Z 8726 defines that color differences ΔEi (i is an integer in a range from 1 to 15) when test colors (R1 to R15) having predetermined reflectance characteristics are colorimetrically measured with a test light source and a reference light source, respectively, are numerically calculated to compute the color rendering index. An upper limit of the color rendering index Ri (i is an integer from 1 to 15) is 100. In other words, when a color difference between the light source and the reference light source having a color temperature corresponding to the light source is smaller, the color rendering index is higher and closer to 100. Among the color rendering indices, an average value of R1 to R8 is referred to as the general color rendering index Ra, and R9 to R15 are referred to as special color rendering indices. For the special color rendering indices, R9 is set for red, R10 is set for yellow, R11 is set for green, R12 is set for blue, R13 is set for a color of Western skin, R14 is set for a color of tree leaves, and R15 is set for a color of Japanese skin. In order to enhance the color rendering property, for example, Patent Literature 1 proposes a light emitting device using a phosphor that emits red light in addition to a phosphor that emits green light to yellow light. The reference light source varies depending on a color temperature, and when the correlated color temperature is less than 5000 K, light of blackbody radiation becomes the reference light source. When the correlated color temperature exceeds 5000 K, CIE daylight (CIE standard illuminant D65) becomes the reference light source (JIS Z 8781-2).

In the light emission of the light emitting device that satisfies the condition (A), the general color rendering index Ra is preferably equal to or more than 80, more preferably equal to or more than 85, and even more preferably equal to or more than 90. When the general color rendering index Ra of the light emission of the light emitting device that satisfies the condition (A) is equal to or more than 80, the device can be used as lighting having a comfortable color rendering property. When the general color rendering index Ra of the light emission of the light emitting device that satisfies the condition (A) is equal to or more than 90, the device can be used as lighting having a comfortable color rendering property in places requiring a high color rendering property.

In the light emission of the light emitting device that satisfies the condition (A), the special color rendering index R9 is preferably equal to or more than 50, or the special color rendering index R12 is preferably equal to or more than 80. The special color rendering index R9 represents red. In the light emission of the light emitting device that satisfies the condition (A), as long as the special color rendering index R9 is equal to or more than 50, the light emitting device can be used without a red component decreasing even in white light emission tinged with blue having the correlated color temperature within the range of 4500 K or more and 7500 K or less. In the light emission of the light emitting device that satisfies the condition (A), the special color rendering index R9 may be equal to or more than 55 and may be equal to or more than 60. The special color rendering index R12 represents blue. As long as the special color rendering index R12 of the light emission of the light emitting device that satisfies the condition (A) is equal to or more than 60, as the light emission of the light emitting device, the light emission that maintains a blue component similar to the reference light source can be obtained without the light emission from a blue component to a blue-green component in a wavelength range of more than 440 nm and 500 nm or less, and the visibility of an object irradiated with the light emitted from the light emitting device can be further improved. In the light emission of the light emitting device that satisfies the condition (A), the special color rendering index R12 may be equal to or more than 70 and may be equal to or more than 80.

In the light emission of the light emitting device that satisfies the condition (A), the special color rendering index R10 may be equal to or more than 80 or may be equal to or more than 90. In the light emission of the light emitting device that satisfies the condition (A), the special color rendering index R11 may be equal to or more than 80 or may be equal to or more than 90. In the light emission of the light emitting device that satisfies the condition (A), the special color rendering index R13 may be equal to or more than 80 or may be equal to or more than 90. In the light emission of the light emitting device that satisfies the condition (A), the special color rendering index R14 may be equal to or more than 80 or may be equal to or more than 90. In the light emission of the light emitting device that satisfies the condition (A), the special color rendering index R15 may be equal to or more than 80 or may be equal to or more than 90. In the light emission of the light emitting device that satisfies the condition (A), when all of the special color rendering indices R10, R11, R13, R14, and R15 are equal to or more than 80, mixed color light having a good color rendering property similar to the reference light source can be obtained.

A light emitting device according to a second embodiment of the present invention includes a light emitting element and a fluorescent member including a phosphor and satisfies the following condition (B).

In the condition (B), a correlated color temperature of light emission of the light emitting device described above is within a range of 2500 K or more and less than 4500 K, a light emission peak wavelength of the light emitting element described above is within a range of 410 nm or more and 440 nm or less, the fluorescent member described above includes a first phosphor of at least one type selected from the group consisting of the phosphor having the composition represented by Formula (i) described above and the phosphor having the composition represented by Formula (ii) described above, a second phosphor of at least one type selected from the group consisting of the phosphor having the composition represented by Formula (iii) described above, and the phosphor having the composition represented by Formula (iv) described above, a third phosphor of at least one type selected from the group consisting of the phosphor having the composition represented by Formula (v) described above, the phosphor having the composition represented by Formula (vi) described above, and the phosphor having the composition represented by Formula (vii) described above, a fourth phosphor being the phosphor having the composition represented by Formula (viii) described above, the content of the first phosphor with respect to a total amount of the phosphor included in the fluorescent member is within a range of 25 mass % or more and 90 mass % or less, and a melanopic ratio derived based on Formula (1) described above in an emission spectrum of the light emitting device described above is within a range of 0.7 or more and 1.1 or less.

When the light emitting device satisfies the condition (B) and the correlated color temperature of the light emission of the light emitting device is within the range of 2500 K or more and less than 4500 K, the ipRGC is stimulated relatively weakly, the arousal of humans is not excessively promoted, and the light inferred for humans to feel comfort is emitted from the light emitting device by lighting of subdued light, if the content of the first phosphor with respect to the total amount of the phosphor included in the fluorescent member is set within the range of 25 mass % or more and 90 mass % or less and the melanopic ratio derived based on Formula (1) described above in the emission spectrum of the light emitting device is within the range of 0.7 or more and 1.1 or less. The total amount of the phosphor included in the fluorescent member refers to a total amount of the first phosphor, the second phosphor, the third phosphor, and the fourth phosphor.

In the light emitting device that satisfies the condition (B), the melanopic ratio derived based on Formula (1) described above in the emission spectrum of the light emitting device is within the range of 0.7 or more and 1.1 or less and is preferably within a range of 0.8 or more and 1.1 or less. When the melanopic ratio derived based on Formula (1) described above in the emission spectrum of the light emitting device is within the range of 0.7 or more and 1.1 or less, the ipRGC is stimulated relatively strongly, and the arousal of humans is promoted. Thus, in workplaces or schools, the light inferred for humans to feel comfort is emitted from the light emitting device.

In the light emitting device that satisfies the condition (B), the content of the second phosphor with respect to the total amount of the phosphor included in the fluorescent member is preferably within a range of 1 mass % or more and 40 mass % or less. In the light emitting device that satisfies the condition (B), the content of the third phosphor with respect to the total amount of the phosphor included in the fluorescent member is preferably within a range of 8 mass % or more and 60 mass % or less. In the light emitting device that satisfies the condition (B), the content of the fourth phosphor with respect to the total amount of the phosphor included in the fluorescent member is preferably within a range of 1 mass % or more and 10 mass % or less.

In the light emitting device that satisfies the condition (B), the content of the first phosphor with respect to the total amount of the phosphor included in the fluorescent member may be within a range of 28 mass % or more and 80 mass % or less, the content of the second phosphor with respect to the total amount of the phosphor included in the fluorescent member may be within a range of 5 mass % or more and 38 mass % or less, the content of the third phosphor with respect to the total amount of the phosphor included in the fluorescent member may be within a range of 14 mass % or more and 55 mass % or less, and the content of the fourth phosphor with respect to the total amount of the phosphor included in the fluorescent member may be within a range of 1 mass % or more and 8 mass % or less.

In the light emitting device that satisfies the condition (B), the content of the first phosphor with respect to the total amount of the phosphor included in the fluorescent member may be within a range of 28 mass % or more and 75 mass % or less, the content of the second phosphor with respect to the total amount of the phosphor included in the fluorescent member may be within a range of 8 mass % or more and 35 mass % or less, the content of the third phosphor with respect to the total amount of the phosphor included in the fluorescent member may be within a range of 15 mass % or more and 50 mass % or less, and the content of the fourth phosphor with respect to the total amount of the phosphor included in the fluorescent member may be within a range of 2 mass % or more and 7 mass % or less.

In the light emitting device that satisfies the condition (B), the first phosphor may be the phosphor having the composition represented by Formula (i) described above, the second phosphor may be the phosphor having the composition represented by Formula (iv) described above, and the third phosphor may be the phosphor having the composition represented by Formula (v) described above.

In the light emitting device that satisfies the condition (B), the first phosphor may be the phosphor having the composition represented by Formula (i) described above, the second phosphor may be the phosphor having the composition represented by Formula (iv) described above, the third phosphor may be the phosphor having the composition represented by Formula (v) described above, the fourth phosphor may be the phosphor having the composition represented by Formula (viii) described above, the content of the first phosphor with respect to the total amount of the phosphor included in the fluorescent member may be within the range of 28 mass % or more and 75 mass % or less, the content of the second phosphor with respect to the total amount of the phosphor included in the fluorescent member may be within the range of 8 mass % or more and 35 mass % or less, the content of the third phosphor with respect to the total amount of the phosphor included in the fluorescent member may be within the range of 15 mass % or more and 50 mass % or less, and the content of the fourth phosphor with respect to the total amount of the phosphor included in the fluorescent member may be within the range of 2 mass % or more and 7 mass % or less.

In the light emitting device that satisfies the condition (B), the first phosphor may be the phosphor having the composition represented by Formula (i) described above, the second phosphor may be the phosphor having the composition represented by Formula (iv) described above, the third phosphor may be the phosphor having the composition represented by Formula (v) described above, the fourth phosphor may be the phosphor having the composition represented by Formula (viii) described above, the content of the first phosphor with respect to the total amount of the phosphor included in the fluorescent member may be within the range of 28 mass % or more and 75 mass % or less, the content of the second phosphor with respect to the total amount of the phosphor included in the fluorescent member may be within the range of 8 mass % or more and 35 mass % or less, the content of the third phosphor with respect to the total amount of the phosphor included in the fluorescent member may be within the range of 15 mass % or more and 50 mass % or less, and the content of the fourth phosphor with respect to the total amount of the phosphor included in the fluorescent member may be within the range of 2 mass % or more and 7 mass % or less, and the melanopic ratio derived based on Formula (1) described above in the emission spectrum of the light emitting device may be within the range of 0.8 or more and 1.1 or less.

In the phosphor included in the light emitting device that satisfies the condition (B), it is preferable that the first phosphor has the light emission peak wavelength within a range of 430 nm or more and 500 nm or less, the second phosphor has the light emission peak wavelength within a range of 480 nm or more and 530 nm or less, the third phosphor has the light emission peak wavelength within a range of 500 nm or more and 580 nm or less, and the fourth phosphor has the light emission peak wavelength within a range of 600 nm or more and 650 nm or less. The first phosphor, the second phosphor, the third phosphor, and the fourth phosphor can absorb light from the light emitting element having the light emission peak wavelength within the range of 410 nm or more and 440 nm or less and can emit mixed color light having the correlated color temperature within the range of 2500 K or more and less than 4500 K.

In the light emission of the light emitting device that satisfies the condition (B), the general color rendering index Ra is preferably equal to or more than 80, is more preferably equal to or more than 85, and may be equal to or more than 86. When the general color rendering index Ra of the light emission of the light emitting device that satisfies the condition (B) is equal to or more than 85, the device can be used as lighting having a color rendering property in which humans feel comfort.

In the light emission of the light emitting device that satisfies the condition (B), the special color rendering index R9 is preferably equal to or more than 50, or the special color rendering index R12 is preferably equal to or more than 50. When the special color rendering index R9 is equal to or more than 50, the light emission can sufficiently obtain a red component. In the light emission of the light emitting device that satisfies the condition (B), the special color rendering index R9 may be equal to or more than 60 and may be equal to or more than 70. As long as the special color rendering index R12 of the light emission of the light emitting device that satisfies the condition (B) is equal to or more than 50, as the light emitted from the light emitting device, the light emission that maintains a blue component similar to the reference light source can be obtained without a blue component to a blue-green component in a range of 410 nm or more and 440 nm or less, and the visibility of an object irradiated with the light emitted from the light emitting device can be further improved. In the light emission of the light emitting device that satisfies the condition (B), the special color rendering index R12 may be equal to or more than 52 and may be equal to or more than 54.

In the light emission of the light emitting device that satisfies the condition (B), the special color rendering index R10 may be equal to or more than 50 or may be equal to or more than 60. In the light emission of the light emitting device that satisfies the condition (B), the special color rendering index R11 may be equal to or more than 60 or may be equal to or more than 70. In the light emission of the light emitting device that satisfies the condition (B), the special color rendering index R13 may be equal to or more than 70 or may be equal to or more than 80. In the light emission of the light emitting device that satisfies the condition (B), the special color rendering index R14 may be equal to or more than 80 or may be equal to or more than 90. In the light emission of the light emitting device that satisfies the condition (B), the special color rendering index R15 may be equal to or more than 80 or may be equal to or more than 90. In the light emission of the light emitting device that satisfies the condition (B), when the special color rendering indices R10, R11, R13, R14, and R15 are within the range described above, mixed color light having a high color rendering property can be obtained.

A light emitting device according to the first embodiment of the present invention includes a light emitting element and a phosphor member including a phosphor and satisfies the following condition (C).

In the condition (C), a correlated color temperature of light emission of the light emitting device is within a range of 2500 K or more and 3000 K or less, a light emission peak wavelength of the light emitting element is within a range of 440 nm or more and 470 nm or less, the fluorescent member includes a first phosphor of at least one type selected from the group consisting of the phosphor having the composition represented by Formula (i) described above and the phosphor having the composition represented by Formula (ii) described above, a second phosphor of at least one type selected from the group consisting of the phosphor having the composition represented by Formula (iii) described above, the phosphor having the composition represented by Formula (iv) described above, the phosphor having the composition represented by Formula (v) described above, the phosphor having the composition represented by Formula (vi) described above, and the phosphor having the composition represented by Formula (vii) described above, a third phosphor being the phosphor having the composition represented by Formula (viii) described above, the content of the first phosphor with respect to a total amount of the phosphor included in the fluorescent member is within a range of 20 mass % or more and 90 mass % or less, and a melanopic ratio derived based on Formula (1) described above in an emission spectrum of the light emitting device described above is within a range of 0.48 or more and 1.1 or less.

In the light emitting device that satisfies the condition (C), the melanopic ratio derived based on Formula (1) described above in the emission spectrum of the light emitting device is within the range of 0.48 or more and 1.1 or less and is preferably within a range of 0.5 or more and 1.1 or less. When the melanopic ratio of the light emitting device that satisfies the condition (C) is within the range of 0.48 or more and 1.1 or less, the ipRGC is not stimulated more than necessary, and the light emitting device can be used in comfort in, for example, a living room required of a relaxed atmosphere.

In the light emitting device that satisfies the condition (C), the content of the second phosphor with respect to the total amount of the phosphor included in the fluorescent member is preferably within a range of 9 mass % or more and 70 mass % or less. In the light emitting device that satisfies the condition (C), the content of the third phosphor with respect to the total amount of the phosphor included in the fluorescent member is preferably within a range of 1 mass % or more and 10 mass % or less.

In the light emitting device that satisfies the condition (C), the content of the first phosphor with respect to the total amount of the phosphor included in the fluorescent member may be within a range of 25 mass % or more and 80 mass % or less, the content of the second phosphor with respect to the total amount of the phosphor included in the fluorescent member may be within a range of 12 mass % or more and 60 mass % or less, and the content of the third phosphor with respect to the total amount of the phosphor included in the fluorescent member may be within a range of 2 mass % or more and 9 mass % or less.

In the light emitting device that satisfies the condition (C), the content of the first phosphor with respect to the total amount of the phosphor included in the fluorescent member may be within a range of 26 mass % or more and 75 mass % or less, the content of the second phosphor with respect to the total amount of the phosphor included in the fluorescent member may be within a range of 20 mass % or more and 55 mass % or less, and the content of the third phosphor with respect to the total amount of the phosphor included in the fluorescent member may be within a range of 5 mass % or more and 8 mass % or less.

In the light emitting device that satisfies the condition (C), the first phosphor may be the phosphor having the composition represented by Formula (iii) described above, and the second phosphor may be the phosphor having the composition represented by Formula (v) described above.

In the light emitting device that satisfies the condition (C), the first phosphor may be the phosphor having the composition represented by Formula (iii) described above, the second phosphor may be the phosphor having the composition represented by Formula (v) described above, and the third phosphor may be the phosphor having the composition represented by Formula (viii) described above, the content of the first phosphor with respect to the total amount of the phosphor included in the fluorescent member may be within the range of 26 mass % or more and 75 mass % or less, the content of the second phosphor with respect to the total amount of the phosphor included in the fluorescent member may be within the range of 20 mass % or more and 55 mass % or less, and the content of the third phosphor with respect to the total amount of the phosphor included in the fluorescent member may be within the range of 5 mass % or more and 8 mass % or less.

In the light emitting device that satisfies the condition (C), the first phosphor may be the phosphor having the composition represented by Formula (iii) described above, the second phosphor may be the phosphor having the composition represented by Formula (v) described above, and the third phosphor may be the phosphor having the composition represented by Formula (viii) described above, the content of the first phosphor with respect to the total amount of the phosphor included in the fluorescent member may be within the range of 26 mass % or more and 75 mass % or less, the content of the second phosphor with respect to the total amount of the phosphor included in the fluorescent member may be within the range of 20 mass % or more and 55 mass % or less, and the content of the third phosphor with respect to the total amount of the phosphor included in the fluorescent member may be within the range of 5 mass % or more and 8 mass % or less, and the melanopic ratio derived based on Formula (1) described above in the emission spectrum of the light emitting device may be within the range of 0.5 or more and 1.1 or less.

In the phosphor included in the light emitting device that satisfies the condition (C), it is preferable that the first phosphor has the light emission peak wavelength within a range of 430 nm or more and 500 nm or less, the second phosphor has the light emission peak wavelength within a range of 480 nm or more and 580 nm or less, and the third phosphor has the light emission peak wavelength within a range of 600 nm or more and 650 nm or less. The first phosphor, the second phosphor, and the third phosphor can absorb light from the light emitting element having the light emission peak wavelength within the range of 440 nm or more and 470 nm or less and can emit mixed color light having the correlated color temperature within the range of 2500 K or more and 3000 K or less.

In the light emission of the light emitting device that satisfies the condition (C), the general color rendering index Ra is preferably equal to or more than 80, and more preferably equal to or more than 85, and may be equal to or more than 90. When the general color rendering index Ra of the light emission of the light emitting device that satisfies the condition (C) is equal to or more than 85, the device can be used as lighting having a color rendering property in which humans feel comfort.

In the light emission of the light emitting device that satisfies the condition (C), the special color rendering index R9 is preferably equal to or more than 40, or the special color rendering index R12 is preferably equal to or more than 80. When the special color rendering index R9 is equal to or more than 40, red does not become difficult to see even under lighting of warm color. In the light emission of the light emitting device that satisfies the condition (C), the special color rendering index R9 may be equal to or more than 42 and may be equal to or more than 45. As long as the special color rendering index R12 of the light emission of the light emitting device that satisfies the condition (C) is equal to or more than 80, as the light emitted from the light emitting device, the light emission including a blue component similar to the reference light source can be obtained without a blue component to a blue-green component in a range of 440 nm or more and 470 nm or less, and the visibility of an object irradiated with the light emitted from the light emitting device can be further improved. In the light emission of the light emitting device that satisfies the condition (C), the special color rendering index R12 may be equal to or more than 82 and may be equal to or more than 83.

In the light emission of the light emitting device that satisfies the condition (C), the special color rendering index R10 may be equal to or more than 80 or may be equal to or more than 85. In the light emission of the light emitting device that satisfies the condition (C), the special color rendering index R11 may be equal to or more than 85 or may be equal to or more than 90. In the light emission of the light emitting device that satisfies the condition (C), the special color rendering index R13 may be equal to or more than 85 or may be equal to or more than 90. In the light emission of the light emitting device that satisfies the condition (C), the special color rendering index R14 may be equal to or more than 90 or may be equal to or more than 95. In the light emission of the light emitting device that satisfies the condition (B), the special color rendering index R15 may be equal to or more than 80 or may be equal to or more than 85. In the light emission of the light emitting device that satisfies the condition (B), when all of the special color rendering indices R10, R11, R13, R14, and R15 are equal to or more than 80, mixed color light having a good color rendering property can be obtained.

Method for Manufacturing Light Emitting Device

The light emitting device illustrated in the first example and the second example can be manufactured by the following manufacturing method. For a molded body formed by integrally molding a first lead and a second lead, the first lead and the second lead are disposed inside a mold, a thermosetting resin or a thermoplastic resin is put into the mold to be cured, and the molded body including a recessed portion including a bottom surface and a lateral surface is formed. A light emitting element is disposed on the first lead including an upward surface that defines the recessed portion and is electrically connected by wires. A phosphor is put into a resin that forms a fluorescent member to form a fluorescent member composition. The light emitting device can be manufactured by injecting the fluorescent member composition into the recessed portion of the molded body, curing the resin, and forming the fluorescent member. When the light emitting device that satisfies the condition (A) described above, the light emitting device that satisfies the condition (B) described above, and the light emitting device that satisfies the condition (C) described above each are the light emitting device in the first example described above or the second example described above, all of the light emitting devices can be manufactured by a similar method.

EXAMPLES

The present invention will be described in detail hereinafter using examples. However, the present invention is not limited to these examples.

Phosphor

Phosphors used in examples and comparative examples are described in Table 1.

Light Emission Peak Wavelength

A light emission peak wavelength and a full width at half maximum of each of the phosphors was obtained from an emission spectrum measured by using a fluorescence spectrophotometer (QE-2000 manufactured by Otsuka Electronics Co., Ltd. or F-4500 manufactured by Hitachi High-Tech Corporation). A first phosphor was irradiated with light having an excitation wavelength of 405 nm to measure the emission spectrum. A second phosphor and a third phosphor were irradiated with light having an excitation wavelength of 450 nm to measure the emission spectrum.

TABLE 1

| Phosphor name | | Light emission peak wavelength (nm) | Composition formula | A full width at half maximum (nm) |
|---|---|---|---|---|
| First phosphor | (i) CCA | 460 | $Ca_5(PO_4)_3Cl:Eu$ | 50 |
| Second phosphor | (iv)SAE | 495 | $Sr_4Al_{14}O_{25}:Eu$ | 80 |
| | (v)YAG | 547 | $Y_3Al_5O_{12}:Ce$ | 100 |
| | (v)GYAG | 543 | $Y_3(Al, Ga)_5O_{12}:Ce$ | 100 |
| | (vi) LAG | 522 | $Lu_3Al_5O_{12}:Ce$ | 100 |
| Third phosphor | (viii)SCASN-1 | 630 | $(Sr, Ca)AlSiN_3:Eu$ | 82 |
| | (viii)SCASN-2 | 620 | (Sr, Ca)AlSiN3:Eu | 75 |
| | (viii)SCASN-3 | 625 | (Sr, Ca)AlSiN3:Eu | 75 |

Example 1

A phosphor ((i) CCA) having the composition represented by Formula (i) described above was used as the first phosphor, a phosphor ((v) YAG) having the composition represented by Formula (v) described above was used as the second phosphor, and a phosphor ((viii) SCASN-1) having the composition represented by Formula (viii) described above was used as the third phosphor. A light emitting element having a light emission peak wavelength of 420 nm was used. A silicone resin was used as a resin forming a fluorescent member. Each of the phosphors was added to the silicone resin, mixed, dispersed, and then defoamed to manufacture a fluorescent member composition forming the fluorescent member, such that the content of each of the phosphors with respect to a total amount of 100 mass % of the first phosphor, the second phosphor, and the third phosphor was a proportion illustrated in Table 2 and a correlated color temperature of light emission of a light emitting device was around 6500 K. The light emitting element was disposed inside a recessed portion of a molded body formed by integrally molding a first lead and a second lead and was electrically connected to the first lead and the second lead by wires. The fluorescent member composition was injected onto the light emitting element to fill the recessed portion of the molded body. Subsequently, the fluorescent member composition was heated at 150° C. for three hours for curing to form the fluorescent member, and thus the light emitting device of Example 1 in a form similar to the light emitting device in the first example illustrated in FIG. 1 was manufactured. In the light emitting device according to Example 1, the correlated color temperature of the light emission was 6500 K, the fluorescent member included the first phosphor being the phosphor having the composition represented by Formula (i) described above, the second phosphor being the phosphor having the composition represented by Formula (v) described above, and the third phosphor being the phosphor having the composition represented by Formula (viii) described above, the content of the first phosphor with respect to the total amount of the phosphor included in the fluorescent member was 78 mass %, a melanopic ratio derived based on Formula (1) described above in an emission spectrum of the light emitting device measured by a measuring method to be described below was 1.18, and the condition (A) was satisfied.

Examples 2 and 3

Light emitting devices of Examples 2 and 3 were manufactured similarly to Example 1 except that the content of the first phosphor, the second phosphor, and the third phosphor with respect to the total amount of the phosphor included in the fluorescent member was set as illustrated in Table 2. In each of the light emitting devices according to Examples 2 and 3, the correlated color temperature of the light emission was 6500 K, the fluorescent member included the first phosphor being the phosphor having the composition represented by Formula (i) described above, the second phosphor being the phosphor having the composition represented by Formula (v) described above, and the third phosphor being the phosphor having the composition represented by Formula (viii) described above, the content of the first phosphor with respect to the total amount of the phosphor included in the fluorescent member was as illustrated in Table 2, a melanopic ratio derived based on Formula (1) described above in an emission spectrum of the light emitting device measured by the measuring method to be described below was as illustrated in Table 3, and the condition (A) was satisfied.

Comparative Example 1

A light emitting device of Comparative Example 1 was manufactured similarly to Example 1 except that a light emitting element having a light emission peak wavelength of 450 nm was used, the first phosphor was not used, a phosphor ((iv) SAE) having the composition represented by Formula (iv) described above, a phosphor ((v) YAG) having the composition represented by Formula (v) described above, and a phosphor ((vi) LAG) having the composition represented by Formula (vi) described above were used as the second phosphor, phosphors ((viii) SCASN-2 and (viii) SCASN-3) each having the composition represented by Formula (viii) described above were used as the third phosphor, and the content of each of the phosphors with respect to the total amount of the phosphor was set as illustrated in Table 2.

Emission Spectrum and Melanopic Ratio

The emission spectrum (spectral distribution) of mixed color light emitted from each of the light emitting devices of examples and comparative example was measured by using an optical measurement system that combined a spectrophotometer (PMA-11 manufactured by Hamamatsu Photonics K.K.) and an integrating sphere. The melanopic ratio was derived based on Formula (1) described above from the spectral distribution of the light emitting device, a sensitivity curve (circadian action curve) of an ipRGC being a photoreceptor located in a retina of mammals proposed by WELL certification, and a visibility curve in photopic vision of mammals including humans defined by Commission Internationale de l'Eclairage (CIE). In examples, two or more light emitting devices were manufactured, and an average value of the plurality of light emitting devices was described in Tables.

Correlated Color Temperature, General Color Rendering Index Ra, and Special Color Rendering Indices R9 to R15

For each of the light emitting devices of examples and comparative example, an optical measurement system that combined a multi-channel spectrometer and an integrating sphere measured a correlated color temperature (Tcp; K) according to JIS Z 8725 and measured a general color rendering index Ra and special color rendering indices R9 to R15 according to JIS Z 8726. In accordance with JIS Z 8781, when the correlated color temperature was less than 5000 K, light of blackbody radiation was set to a reference light source, and when the correlated color temperature exceeded 5000 K, CIE daylight (CIE standard illuminant D65) was set to the reference light source. In examples, two or more light emitting devices were manufactured, and an average value of the plurality of light emitting devices was described in Tables.

tions, and the like requiring severer visibility of color. Furthermore, in the light emission of each of the light emitting devices according to Examples 1 to 3, the special color rendering index R9 was equal to or more than 60, and the special color rendering index R12 was equal to or more than 80. The light emission of each of the light emitting devices according to Examples 1 to 3 could further improve visibility of an irradiated object without a red component decreasing even in white light emission tinged with blue having the correlated color temperature of 6500 K.

The light emitting device according to Comparative Example 1 did not include the first phosphor and did not satisfy the condition (A). In the light emission of the light emitting device according to Comparative Example 1, the melanopic ratio was less than 1.0, and the ipRGC was less stimulated. Furthermore, in the light emission of the light emitting device according to Comparative Example 1, the special color rendering index R9 was 8.5 and extremely low.

Example 4

A phosphor ((i) CCA) having the composition represented by Formula (i) described above was used as the first phosphor, a phosphor ((iv) SAE) having the composition represented by Formula (iv) described above was used as the

TABLE 2

|  | Example 1 | | Example 2 | | Example 3 | | Comparative example 1 | |
| --- | --- | --- | --- | --- | --- | --- | --- | --- |
|  | Phosphor | Content (mass %) | Phosphor | Content (mass %) | Phosphor | Content (mass %) | Phosphor | Content (mass %) |
| First phosphor | (i)CCA | 78.0 | (i)CCA | 58.2 | (i)CCA | 68.0 | — | — |
| Second phosphor | (v)YAG | 21.0 | (v)YAG | 39.0 | (v)YAG | 30.1 | (iv)SAE (vi)LAG (v)YAG | 19.0 54.0 23.0 |
| Third phosphor | (viii)SCASN-1 | 2.0 | (viii)SCASN-1 | 2.7 | (viii)SCASN-1 | 1.9 | (viii)SCASN-2 (viii)SCASN-3 | 2.0 2.0 |

TABLE 3

|  |  | Example 1 | Example 2 | Example 3 | Comparative example 1 |
| --- | --- | --- | --- | --- | --- |
| Correlated color temperature |  | 6500K | | | |
| General color rendering index | Ra | 90.3 | 96.1 | 93.9 | 83.8 |
| Special color rendering index | R9 | 77.7 | 63.8 | 60.7 | 8.5 |
|  | R10 | 83.4 | 97.7 | 97.4 | 71.7 |
|  | R11 | 90.7 | 97.7 | 92.7 | 83.8 |
|  | R12 | 85.7 | 86.6 | 95.7 | 54.7 |
|  | R13 | 95.5 | 96.4 | 97.8 | 84.3 |
|  | R14 | 93.2 | 98.3 | 96.6 | 95.8 |
|  | R15 | 95.4 | 91.8 | 91.7 | 76.7 |
| Melanopic ratio |  | 1.18 | 1.06 | 1.15 | 0.98 |

In light emission of each of the light emitting devices according to Examples 1 to 3 that had the correlated color temperature of 6500 K and satisfied the condition (A), the melanopic ratio was within the range of 1.0 or more and 1.4 or less, and the ipRGC could be stimulated relatively strongly to promote arousal of humans. Thus, the light inferred for humans to feel comfort was emitted from each light emitting device in workplaces or schools. Furthermore, the light emission of each of the light emitting devices according to Examples 1 to 3 had the general color rendering index Ra of 90 or more and could be suitably used in color inspections, galleries, museums, places for clinical inspecsecond phosphor, a phosphor ((v) GYAG) having the composition represented by Formula (v) described above was used as the third phosphor, and a phosphor ((viii) SCASN-1) having the composition represented by Formula (viii) described above was used as the fourth phosphor. A light emitting device of Example 4 in a form similar to the second example illustrated in FIG. 2 was manufactured similarly to Example 1 except that each of the phosphors was added to the silicone resin to manufacture a fluorescent member composition such that the content of each of the phosphors with respect to a total amount of 100 mass % of the first phosphor, the second phosphor, the third phosphor, and the fourth phosphor was a proportion illustrated in Table 4, and a correlated color temperature of light emission of the light emitting device was around 4000 K. In the light emitting device according to Example 4, the correlated color temperature of the light emission was 4000 K, the fluorescent member included the first phosphor being the phosphor having the composition represented by Formula (i) described above, the second phosphor being the phosphor having the composition represented by Formula (iv) described above, the third phosphor being the phosphor having the composition represented by Formula (v) described above, and the fourth phosphor being the phosphor having the composition represented by Formula (viii) described above, the content of the first phosphor with respect to the total amount of the phosphor included in the fluorescent member was 62 mass %, a melanopic ratio derived based on Formula (1) described above in an emission spectrum of the light emitting device measured by the measuring method described above was 0.88, and the condition (B) was satisfied.

Examples 5 to 7

Light emitting devices of Examples 5 to 7 were manufactured similarly to Example 4 except that the content of each of the first phosphor, the second phosphor, the third phosphor, and the fourth phosphor with respect to the total amount of the phosphor included in the fluorescent member was set as illustrated in Table 4. In each of the light emitting devices according to Examples 5 to 7, the correlated color temperature of the light emission was 4000 K, the fluorescent member included the first phosphor being the phosphor having the composition represented by Formula (i) described above, the second phosphor being the phosphor having the composition represented by Formula (iv) described above, the third phosphor being the phosphor having the composition represented by Formula (v) described above, and the fourth phosphor being the phosphor having the composition represented by Formula (viii) described above, the content of the first phosphor with respect to the total amount of the phosphor included in the fluorescent member was as illustrated in Table 4, a melanopic ratio derived based on Formula (1) described above in an emission spectrum of the light emitting device measured by the measuring method described above was as illustrated in Table 5, and the condition (B) was satisfied.

Comparative Example 2

A light emitting element having a light emission peak wavelength of 450 nm was used, the first phosphor and the second phosphor were not used, a phosphor ((v) YAG) having the composition represented by Formula (v) described above was used as the third phosphor, and phosphors ((viii) SCASN-2 and (viii) SCASN-3) each having the composition represented by Formula (viii) described above were used as the fourth phosphor. A light emitting device of Comparative Example 2 was manufactured similarly to Example 4 except that the third phosphor and the fourth phosphor were blended such that a type of the third phosphor, a type of the fourth phosphor, and a content of each of the phosphors with respect to the total amount of the phosphor were set as illustrated in Table 4.

TABLE 4

|  | Example 4 | | Example 5 | | Example 6 | |
| --- | --- | --- | --- | --- | --- | --- |
|  | Phosphor | Content (mass %) | Phosphor | Content (mass %) | Phosphor | Content (mass %) |
| First phosphor | (i)CCA | 62.0 | (i)CCA | 29.0 | (i)CCA | 44.0 |
| Second phosphor | (iv)SAE | 9.0 | (iv)SAE | 14.0 | (iv)SAE | 11.0 |
| Third phosphor | (v)GYAG | 26.0 | (v)GYAG | 52.0 | (v)GYAG | 40.0 |
| Fourth phosphor | (viii)SCASN-1 | 4.0 | (viii)SCASN-1 | 5.0 | (viii)SCASN-1 | 4.0 |

|  | Example 7 | | Comparative example 2 | |
| --- | --- | --- | --- | --- |
|  | Phosphor | Content (mass %) | Phosphor | Content (mass %) |
| First phosphor | (i)CCA | 28.0 | — | — |
| Second phosphor | (iv)SAE | 28.0 | — | — |
| Third phosphor | (v)GYAG | 38.0 | (v)YAG | 94.0 |
| Fourth phosphor | (viii)SCASN-1 | 7.0 | (viii)SCASN-2 | 2.0 |
|  |  |  | (viii)SCASN-3 | 4.0 |

TABLE 5

|  |  | Example 4 | Example 5 | Example 6 | Example 7 | Comparative example 2 |
|---|---|---|---|---|---|---|
| Correlated color temperature | | | | 4000K | | |
| General color rendering index | Ra | 88.4 | 94.6 | 92.4 | 86.7 | 83.3 |
| Special color rendering index | R9 | 85.5 | 75.9 | 76.7 | 92.1 | 9.7 |
|  | R10 | 76.1 | 91.5 | 86.2 | 68.1 | 73.6 |
|  | R11 | 89.7 | 91.5 | 92.5 | 76.0 | 82.3 |
|  | R12 | 77.0 | 75.2 | 85.4 | 54.7 | 60.5 |
|  | R13 | 91.5 | 97.4 | 95.9 | 84.5 | 83.5 |
|  | R14 | 92.2 | 97.0 | 94.6 | 93.0 | 97.0 |
|  | R15 | 95.4 | 95.5 | 96.0 | 90.7 | 75.4 |
| Melanopic ratio | | 0.88 | 0.83 | 0.87 | 0.86 | 0.69 |

In light emission of each of the light emitting devices according to Examples 4 to 7 that had a correlated color temperature of 4000 K and satisfied the condition (B), a melanopic ratio was within a range of 0.70 or more and 1.1 or less, and the ipRGC was stimulated relatively weakly not to excessively promote arousal of humans. Thus, the light inferred for humans to feel comfort by lighting having comfortable light was emitted from each light emitting device in a living environment associated with work in, for example, houses, hotels, restaurants, and shops. The light emission of each of the light emitting devices according to Examples 4 to 7 had a general color rendering index Ra of 85 or more and could be used as lighting having a color rendering property in which humans felt comfort in the living environment. In the light emission of each of the light emitting devices according to Examples 4 to 7, a special color rendering index R9 was equal to or more than 50, and a special color rendering index R12 was equal to or more than 50.

The light emitting device according to Comparative Example 2 did not include the first phosphor and the second phosphor and did not satisfy the condition (B). In the light emission of the light emitting device according to Comparative Example 2, the melanopic ratio was less than 0.7, and the ipRGC was less stimulated. Furthermore, in the light emission of the light emitting device according to Comparative Example 2, the special color rendering index R9 was 9.7 and extremely low.

Example 8

A phosphor ((iii) SAE) having the composition represented by Formula (iii) described above was used as the first phosphor, a phosphor ((v) YAG) having the composition represented by Formula (v) described above was used as the second phosphor, and phosphors ((viii) SCASN-1 and (viii) SCASN-3) each having the composition represented by Formula (viii) described above were used as the third phosphor. A light emitting element having a light emission peak wavelength of 452 nm was used. A light emitting device of Example 8 in a form similar to the first example illustrated in FIG. 1 was manufactured similarly to Example 1 except that each of the phosphors was added to the silicone resin to manufacture a fluorescent member composition such that the content of each of the phosphors with respect to a total amount of 100 mass % of the first phosphor, the second phosphor, and the third phosphor was a proportion illustrated in Table 6, and a correlated color temperature of light emission of the light emitting device was around 2700 K. In the light emitting device according to Example 8, the correlated color temperature of the light emission was 2700 K, the fluorescent member included the first phosphor being the phosphor having the composition represented by Formula (iii) described above, the second phosphor being the phosphor having the composition represented by Formula (v) described above, and the third phosphor being the phosphor having the composition represented by Formula (viii) described above, the content of the first phosphor with respect to the total amount of the phosphor included in the fluorescent member was 56 mass %, a melanopic ratio derived based on Formula (1) described above in an emission spectrum of the light emitting device measured by the measuring method described above was 0.52, and the condition (C) was satisfied.

Examples 9 and 10

Light emitting devices of Examples 9 and 10 were manufactured similarly to Example 8 except that the content of each of the first phosphor, the second phosphor, and the third phosphor with respect to the total amount of the phosphor included in the fluorescent member was set as illustrated in Table 6. In each of the light emitting devices according to Examples 9 and 10, a correlated color temperature of light emission was 2700 K, the fluorescent member included the first phosphor being the phosphor having the composition represented by Formula (iii) described above, the second phosphor being the phosphor having the composition represented by Formula (v) described above, and the third phosphor being the phosphor having the composition represented by Formula (viii) described above, the content of the first phosphor with respect to the total amount of the phosphor included in the fluorescent member was as described in Table 6, a melanopic ratio derived based on Formula (1) described above in an emission spectrum of the light emitting device measured by the measuring method described above was as described in Table 7, and the condition (C) was satisfied.

Comparative Example 3

A light emitting device of Comparative Example 3 was manufactured similarly to Example 8 except that a light emitting element having a light emission peak wavelength of 450 nm was used, the first phosphor was not used, a phosphor ((v) YAG) having the composition represented by Formula (v) described above was used as the second phosphor, phosphors ((viii) SCASN-2 and (viii) SCASN-3) each having the composition represented by Formula (viii) described above were used as the third phosphor, and the content of each of the phosphors with respect to the total amount of the phosphor was set as illustrated in Table 6.

TABLE 6

|  | Example 8 | | Example 9 | | Example 10 | | Comparative example 3 | |
| --- | --- | --- | --- | --- | --- | --- | --- | --- |
|  | Phosphor | Content (mass %) | Phosphor | Content (mass %) | Phosphor | Content (mass %) | Phosphor | Content (mass %) |
| First phosphor | (iii)SAE | 56.0 | (iii)SAE | 26.0 | (iii)SAE | 38.0 | — | — |
| Second phosphor | (v)YAG | 38.0 | (v)YAG | 66.0 | (v)YAG | 54.0 | (v)YAG | 91.0 |
| Third phosphor | (viii)SCASN-1 (viii)SCASN-3 | 1.0 5.0 | (viii)SCASN-1 (viii)SCASN-3 | — 8.0 | (viii)SCASN-1 (viii)SCASN-3 | — 7.0 | (viii)SCASN-2 (viii)SCASN-3 | 6.0 3.0 |

TABLE 7

|  |  | Example 8 | Example 9 | Example 10 | Comparative example 3 |
| --- | --- | --- | --- | --- | --- |
| Correlated color temperature | | 2700K | | | |
| General color rendering index | Ra | 94.1 | 90.4 | 92.6 | 83.2 |
| Special color rendering index | R9 | 63.7 | 46.9 | 54.4 | 9.0 |
|  | R10 | 96.6 | 89.5 | 95.9 | 85.4 |
|  | R11 | 95.5 | 91.1 | 96.6 | 82.1 |
|  | R12 | 89.9 | 83.0 | 90.2 | 76.8 |
|  | R13 | 98.5 | 91.1 | 93.7 | 85.6 |
|  | R14 | 97.5 | 99.7 | 98.4 | 97.6 |
|  | R15 | 90.5 | 84.7 | 88.8 | 74.7 |
| Melanopic ratio | | 0.52 | 0.48 | 0.50 | 0.47 |

In light emission of each of the light emitting devices according to Examples 8 to 10 that had a correlated color temperature of 2700 K and satisfied the condition (C) described above, a melanopic ratio was within a range of 0.48 or more and 1.1 or less, and the ipRGC was not stimulated more than necessary. Thus, the light inferred for humans to feel comfort was emitted from each light emitting device in a living environment such as a living room required of a relaxed atmosphere. The light emission of each of the light emitting devices according to Examples 8 to 10 had a general color rendering index Ra of 85 or more and could be used as lighting having a color rendering property in which humans felt comfort in the living environment. In the light emission of each of the light emitting devices according to Examples 8 to 10, a special color rendering index R9 was equal to or more than 40, and a special color rendering index R12 was equal to or more than 80.

The light emitting device according to Comparative Example 3 did not include the first phosphor and did not satisfy the condition (C). The light emission of the light emitting device according to Comparative Example 3 had the melanopic ratio of less than 0.48, could not suppress secretion of melatonin, and thus could become lighting inducing sleep. Furthermore, in the light emission of the light emitting device according to Comparative Example 3, the special color rendering index R9 was 9.0 and extremely low.

INDUSTRIAL APPLICABILITY

The light emitting device according to an embodiment of the present invention can be used as, for example, lighting equipment.

REFERENCE SIGNS LIST

10 Light emitting element
20 First lead
30 Second lead
40 Molded body
50 Fluorescent member
70, 71, 72, 73, 74 Phosphor
100 Light emitting device

What is claimed:

1. A light emitting device comprising:
a light emitting element; and
a fluorescent member comprising a phosphor,
wherein the light emitting element, the phosphor, a melanopic ratio derived based on Formula (1) described below in an emission spectrum of the light emitting device, and a content percentage of a first phosphor described below with respect to a total amount of the phosphor contained in the fluorescent member satisfy any of Condition (A) or Condition (B) described below, $$\text{Melanopic ratio} = \frac{\int_{380}^{730} \text{Lamp} \times \text{Circadian}}{\int_{380}^{730} \text{Lamp} \times \text{Visual}} \times 1.218 \quad (1)$$

wherein in Formula (1), "Lamp" is a spectral distribution of the light emitting device, "Circadian" is a sensitivity curve of an intrinsically photosensitive retinal ganglion cell being a photoreceptor located in a retina of mammals, "Visual" is a visibility curve in photopic vision of humans, "1.218" is a constant (lux factor), and in a range of a wavelength in a range of 380 nm or more and 730 nm or less, a product of "Lamp" and "Circadian" is a circadian response comprised in the spectral distribution of the light emitting device and a product of "Lamp" and "Visual" is a visibility response comprised in the spectral distribution of the light emitting device,
Condition (A):

a correlated color temperature of light emission of the light emitting device is within a range of 4500 K or more and 7500 K or less,
a light emission peak wavelength of the light emitting element is within a range of 410 nm or more and 440 nm or less,
the fluorescent member comprises
a first phosphor comprising at least one type selected from the group consisting of a phosphor having a composition represented by Formula (i) described below and a phosphor having a composition represented by Formula (ii) described below,
a second phosphor comprising at least one type selected from the group consisting of a phosphor having a composition represented by Formula (iii) described below, a phosphor having a composition represented by Formula (iv) described below, a phosphor having a composition represented by Formula (v) described below, a phosphor having a composition represented by Formula (vi) described below, and a phosphor having a composition represented by Formula (vii) described below, and
a third phosphor having a composition represented by Formula (viii) described below,
a content percentage of the first phosphor is within a range of 29 mass % or more and 90 mass % or less, and
the melanopic ratio is within a range of 1.0 or more and 1.4 or less, Condition (B):
a correlated color temperature of light emission of the light emitting device is within a range of 2500 K or more and less than 4500 K,
a light emission peak wavelength of the light emitting element is within a range of 410 nm or more and 440 nm or less,
the fluorescent member comprises
a first phosphor comprising at least one type selected from the group consisting of a phosphor having a composition represented by Formula (i) described below and a phosphor having a composition represented by Formula (ii) described below,
a second phosphor comprising at least one type selected from the group consisting of a phosphor having a composition represented by Formula (iii) described below and a phosphor having a composition represented by Formula (iv) described below,
a third phosphor comprising at least one type selected from the group consisting of a phosphor having a composition represented by Formula (v) described below, a phosphor having a composition represented by Formula (vi) described below, and a phosphor having a composition represented by Formula (vii) described below, and
a fourth phosphor having a composition represented by Formula (viii) described below,
a content percentage of the first phosphor is within a range of 25 mass % or more and 90 mass % or less, and
the melanopic ratio is within a range of 0.7 or more and 1.1 or less, $$M^1{}_{10}(PO_4)_6Cl_2:Eu \tag{i}$$

wherein in Formula (i), $M^1$ is at least one element selected from the group consisting of Ca, Sr, and Ba, $$M^2MgAl_{10}O_{17}:Mn,Eu \tag{ii}$$

wherein in Formula (ii), $M^2$ is at least one element selected from the group consisting of Ba and Sr, $$M^3{}_8MgSi_4O_{16}Cl_2:Eu \tag{iii}$$

wherein in Formula (iii), $M^3$ is at least one element selected from the group consisting of Ca, Sr, and Ba, $$Sr_4Al_{14}O_{25}:Eu \tag{iv}$$

$$M^4{}_3M^5{}_5O_{12}:Ce \tag{v}$$

wherein in Formula (v), $M^4$ is at least one element selected from the group consisting of Y and Gd, and $M^5$ is at least one element selected from the group consisting of Al and Ga, $$Lu_3M^6{}_5O_{12}:Ce \tag{vi}$$

wherein in Formula (vi), $M^6$ is at least one element selected from the group consisting of Al and Ga, $$Si_{6-z}Al_zO_zN_{8-z}:Eu \tag{vii}$$

wherein in Formula (vii), z satisfies $0<z\leq4.2$, $$M^7AlSiN_3:Eu \tag{viii}$$

wherein in Formula (viii), $M^7$ is at least one element selected from the group consisting of Sr and Ca.

2. The light emitting device according to claim 1, wherein the Condition (A) is satisfied, and the melanopic ratio in the emission spectrum is in a range of 1.15 or more and 1.4 or less.

3. The light emitting device according to claim 1, wherein the Condition (A) is satisfied, and a content percentage of the second phosphor with respect to the total amount of the phosphor contained in the fluorescent member is within a range of 9 mass % or more and 70 mass % or less.

4. The light emitting device according to claim 1, wherein the Condition (A) is satisfied, and a content percentage of the third phosphor with respect to the total amount of the phosphor contained in the fluorescent member is within a range of 1 mass % or more and 10 mass % or less.

5. The light emitting device according to claim 1, wherein the first phosphor has a light emission peak wavelength within a range of 430 nm or more and 500 nm or less, the second phosphor has a light emission peak wavelength within a range of 480 nm or more and 580 nm or less, and the third phosphor has a light emission peak wavelength within a range of 600 nm or more and 650 nm or less.

6. The light emitting device according to claim 1, wherein the Condition (A) is satisfied, a general color rendering index of the light emission is equal to or more than 90, and a special color rendering index R9 of the light emission is equal to or more than 50 or a special color rendering index R12 of the light emission is equal to or more than 80.

7. The light emitting device according to claim 1, wherein the Condition (B) is satisfied, and the melanopic ratio in the emission spectrum is in a range of 0.8 or more and 1.1 or less.

8. The light emitting device according to claim 1, wherein the Condition (B) is satisfied, and a content percentage of the second phosphor with respect to the total amount of the phosphor contained in the fluorescent member is within a range of 1 mass % or more and 40 mass % or less.

9. The light emitting device according to claim 1, wherein the Condition (B) is satisfied, and a content percentage of the third phosphor with respect to the total amount of the phosphor contained in the fluorescent member is within a range of 8 mass % or more and 60 mass % or less.

10. The light emitting device according to claim 1, wherein
- the Condition (B) is satisfied, and a content percentage of the fourth phosphor with respect to the total amount of the phosphor contained in the fluorescent member is within a range of 1 mass % or more and 10 mass % or less.

11. The light emitting device according to claim 1, wherein
- the first phosphor has a light emission peak wavelength within a range of 430 nm or more and 500 nm or less, the second phosphor has a light emission peak wavelength within a range from 480 nm to 530 nm, the third phosphor has a light emission peak wavelength within a range of 500 nm or more and 580 nm or less, and the fourth phosphor has a light emission peak wavelength within a range of 600 nm or more and 650 nm or less.

12. The light emitting device according to claim 1, wherein
- the Condition (B) is satisfied, a general color rendering index of the light emission is equal to or more than 85, and a special color rendering index R9 of the light emission is equal to or more than 50 or a special color rendering index R12 of the light emission is equal to or more than 50.

\* \* \* \* \*